(12) United States Patent
Parker et al.

(10) Patent No.: US 7,268,989 B2
(45) Date of Patent: Sep. 11, 2007

(54) ARC FAULT CIRCUIT INTERRUPTER FOR A COMPRESSOR LOAD

(75) Inventors: Kevin L. Parker, Pittsburgh, PA (US); Robert T. Elms, Monroeville, PA (US)

(73) Assignee: Eaton Corporation, Cleveland, OH (US)

(*) Notice: Subject to any disclaimer, the term of this patent is extended or adjusted under 35 U.S.C. 154(b) by 354 days.

(21) Appl. No.: 11/103,118

(22) Filed: Apr. 11, 2005

(65) Prior Publication Data

US 2006/0227469 A1    Oct. 12, 2006

(51) Int. Cl.
H02H 3/16    (2006.01)

(52) U.S. Cl. .......................................... 361/42; 361/44

(58) Field of Classification Search ................. 361/42, 361/44; 702/58
See application file for complete search history.

(56) References Cited

U.S. PATENT DOCUMENTS

| | | | |
|---|---|---|---|
| 4,783,713 A * | 11/1988 | Chen | 361/48 |
| 5,224,006 A | 6/1993 | MacKenzie et al. | |
| 5,691,869 A | 11/1997 | Engel et al. | |
| 5,726,577 A | 3/1998 | Engel et al. | |
| 5,818,237 A | 10/1998 | Zuercher et al. | |
| 5,839,092 A * | 11/1998 | Erger et al. | 702/58 |
| 6,246,556 B1 | 6/2001 | Haun et al. | |
| 6,259,996 B1 | 7/2001 | Haun et al. | |
| 6,388,849 B1 | 5/2002 | Rae | |
| 6,477,021 B1 | 11/2002 | Haun et al. | |
| 6,625,550 B1 * | 9/2003 | Scott et al. | 702/58 |
| 6,650,516 B2 | 11/2003 | Langford et al. | |
| 6,653,219 B2 | 11/2003 | Fukuyama | |
| 6,987,389 B1 * | 1/2006 | Macbeth et al. | 324/536 |
| 2003/0072113 A1 | 4/2003 | Wong et al. | |
| 2003/0227290 A1 | 12/2003 | Parker | |
| 2004/0042137 A1 | 3/2004 | Wong et al. | |

OTHER PUBLICATIONS

Microchip Technoogy Inc., "Save More Energy with PIC Microcontrollers featuring nanoWatt Technology", www.microchip.com/nanowatt, 2003, 2 pp.
IAEI News, "Five New Categories for AFCI Devices Under UL 1699", 2003, p. 94.
Underwriters Laboratories, "Arc Fault Circuit Interrupters—UL 1699", Dec. 2000, pp. 33, 34, 43-45.

* cited by examiner

*Primary Examiner*—Michael Sherry
*Assistant Examiner*—Danny Nguyen
(74) *Attorney, Agent, or Firm*—Martin J. Morgan

(57) ABSTRACT

An arc fault circuit interrupter includes separable contacts electrically connected between line and load terminals, and a current sensor adapted to sense current flowing between the terminals and through the contacts. An arc fault detection circuit is adapted to collect a plurality of samples of the sensed current for a line cycle, determine a first slope of the sensed current at about a zero crossing of a line voltage, determine a magnitude of one of the samples at about the zero crossing, determine a second slope of the sensed current at another one of the samples having about the magnitude, with the first slope being opposite in polarity with respect to the second slope. The arc fault detection circuit calculates a difference between the slopes, and generates a trip signal as a function of the difference. An operating mechanism is adapted to open the contacts responsive to the trip signal.

19 Claims, 13 Drawing Sheets

ARC FAULT CIRCUIT INTERRUPTER FOR A COMPRESSOR LOAD

CROSS-REFERENCE TO RELATED APPLICATIONS

This application is related to commonly assigned:

U.S. pat. application Ser. No. 10/895,158, filed Jul. 20, 2004, entitled "Arc Fault Circuit Interrupter"; and U.S. pat. application Ser. No. 11/100,363, filed Apr. 6, 2005, entitled "Method and Arc Fault Circuit Interrupter Employing a Hysteresis Value for Compressor Rumble".

BACKGROUND OF THE INVENTION

1. Field of the Invention

This invention relates generally to circuit interrupters and, more particularly, to circuit interrupters including an arc fault trip mechanism which responds to sputtering arc faults.

2. Background Information

Arcing is a luminous discharge of electricity across an insulating medium, usually accompanied by the partial volatilization of electrodes. An arc fault is an unintentional arcing condition in an electrical circuit. Arc faults can be caused, for instance, by worn insulation between adjacent bared conductors, by exposed ends between broken conductors, by faulty electrical connections, and in other situations where conducting elements are in close proximity.

Arc faults in systems can be intermittent since the magnetic repulsion forces generated by the arc current force the conductors apart to extinguish the arc. Mechanical forces then bring the conductors together again in order that another arc is struck.

Circuit interrupters include, for example, circuit breakers, contactors, motor starters, motor controllers, other load controllers and receptacles having a trip mechanism. Circuit breakers are generally old and well known in the art. Circuit breakers are used to protect electrical circuitry from damage due to an overcurrent condition, such as an overload condition or a relatively high level short circuit or fault condition. In small circuit breakers, commonly referred to as miniature circuit breakers, used for residential and light commercial applications, such protection is typically provided by a thermal-magnetic trip device. This trip device includes a bimetal, which is heated and bends in response to a persistent overcurrent condition. The bimetal, in turn, unlatches a spring powered operating mechanism, which opens the separable contacts of the circuit breaker to interrupt current flow in the protected power system. An armature, which is attracted by the sizable magnetic forces generated by a short circuit or fault, also unlatches, or trips, the operating mechanism.

Recently, there has been considerable interest in providing protection against arc faults. Because of their intermittent and high impedance nature, arc faults do not generate currents of either sufficient instantaneous magnitude or sufficient average RMS current to trip the conventional circuit interrupter. Even so, the arcs can cause damage or start a fire if they occur near combustible material. It is not practical to simply lower the pick-up currents on conventional circuit breakers, as there are many typical loads, which draw similar currents and would, therefore, cause nuisance trips. Consequently, separate electrical circuits have been developed for responding to arc faults. See, for example, U.S. Pat. Nos. 5,224,006; and 5,691,869.

For example, an arc fault circuit interrupter (AFCI) is a device intended to mitigate the effects of arc faults by functioning to deenergize an electrical circuit when an arc fault is detected. Non-limiting examples of AFCIs include: (1) arc fault circuit breakers; (2) branch/feeder arc fault circuit interrupters, which are intended to be installed at the origin of a branch circuit or feeder, such as a panelboard, and which may provide protection from ground faults (e.g., greater than 40 mA) and line-to-neutral faults (e.g., greater than 75 A); (3) outlet circuit arc fault circuit interrupters, which are intended to be installed at a branch circuit outlet, such as an outlet box, in order to provide protection of cord sets and power-supply cords connected to it (when provided with receptacle outlets) against the unwanted effects of arcing, and which may provide protection from line-to-ground faults (e.g., greater than 75 A) and line-to-neutral faults (e.g., 5 to 30 A, and greater than 75 A); (4) cord arc fault circuit interrupters, which are intended to be connected to a receptacle outlet, in order to provide protection to an integral or separate power supply cord; (5) combination arc fault circuit interrupters, which function as either a branch/feeder or an outlet circuit AFCI; and (6) portable arc fault circuit interrupters, which are intended to be connected to a receptacle outlet and provided with one or more outlets.

UL 1699 is a specification that governs the performance of AFCI products including branch/feeder type (AVZQ); outlet circuit type (AWCG); portable type (AWDO); cord type (AWAY); and combination type (AWAH) AFCIs. A carbonized path arc clearing time test is conducted in which the total clearing time before the AFCI trips shall not exceed specified arc test clearing times based upon different levels of test current (i.e., 5 A; 10 A; 15 A or 20 A; 22.5 A or 30 A). UL 1699 requires that the combination type AFCI must detect and interrupt the parallel combination of compressor and arc within a one-second clearing time for an arc test current of 5 A (resistive load).

Fulfilling this requirement is difficult because normal load currents of capacitor-start motors used in compressors typically exhibit phase and amplitude modulation, as well as harmonic content. The compressor, which is required to have a peak inrush current of about 130 A per UL 1699, usually draws much more steady-state current than a 5 A arc. As a result, the challenge is to quickly and reliably identify an arcing current which is superimposed over a much larger, harmonic-laden, amplitude- and phase-modulated compressor current.

There is, therefore, room for improvement in arc fault circuit interrupters.

SUMMARY OF THE INVENTION

These needs and others are met by the present invention which employs the derivative of current to identify arcs in parallel with a load, such as a compressor. An arc fault detection circuit determines a first slope of sensed current at about a zero crossing of a line voltage, determines a magnitude of one of plural current samples at about the zero crossing, determines a second slope of the sensed current at another one of the samples having about the magnitude, with the first slope being opposite in polarity with respect to the second slope. The arc fault detection circuit calculates a difference between the slopes, and generates a trip signal as a function of the difference.

As one aspect of the invention, an arc fault circuit interrupter comprises: a line terminal adapted to receive a line voltage including a zero crossing; a load terminal; separable contacts electrically connected between the line terminal and the load terminal; a current sensor adapted to sense current flowing between the line terminal and the load terminal and through the separable contacts, the sensed current including a line cycle; an arc fault detection circuit adapted to collect a plurality of samples of the sensed current for the line cycle, determine a first slope of the sensed current at about the zero crossing of the line voltage, determine a magnitude of one of the samples at about the zero crossing, determine a second slope of the sensed current at another one of the samples having about the magnitude, the first slope being opposite in polarity with respect to the second slope, calculate a difference between the first and second slopes, and generate a trip signal as a function of the difference; and an operating mechanism adapted to open the separable contacts responsive to the trip signal.

The one of the samples at about the zero crossing may be a first one of the samples. The arc fault detection circuit may include a zero crossing detector adapted to detect the zero crossing of the line voltage and a routine adapted to determine the first slope based upon a difference between the first one of the samples and a second one of the samples prior to the first one of the samples. The routine may also be adapted to determine a third one of the samples having about the magnitude of the first one of the samples, and determine the second slope based upon a difference between a fourth one of the samples after the third one of the samples and the third one of the samples.

The arc fault detection circuit may be further adapted to determine if the difference is greater than a first value and, if so, responsively add an increment value to an accumulator, and determine if the accumulator exceeds a second predetermined value and, if so, generate the trip signal.

The increment value may be a fixed predetermined value.

The arc fault detection circuit may be further adapted to determine a peak current of the samples of the sensed current for a half-cycle of the line cycle, and the increment value may be a function of the peak current.

The increment value may be a function of the difference.

The arc fault detection circuit may be further adapted to subtract a decrement value from the accumulator if the difference is not greater than the first value.

The first value may be a fixed predetermined value.

The arc fault detection circuit may be further adapted to determine a peak current of the samples of the sensed current for a half-cycle of the line cycle, and the first value may be a function of the peak current.

The arc fault detection circuit may be further adapted to determine a maximum positive value of the slope of the sensed current for the samples of the sensed current for a half-cycle of the line cycle, determine a positive slope of the sensed current after about a positive zero crossing of the line voltage, and disable adding the increment value to the accumulator unless the positive slope is less than one-half of the maximum positive value of the slope of the sensed current for the samples of the sensed current for the half-cycle of the line cycle.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The present invention is described in association with a single pole branch/feeder arc fault circuit interrupter (AFCI), although the invention is applicable to a wide range of AFCIs including one or more poles.

Figure 1:
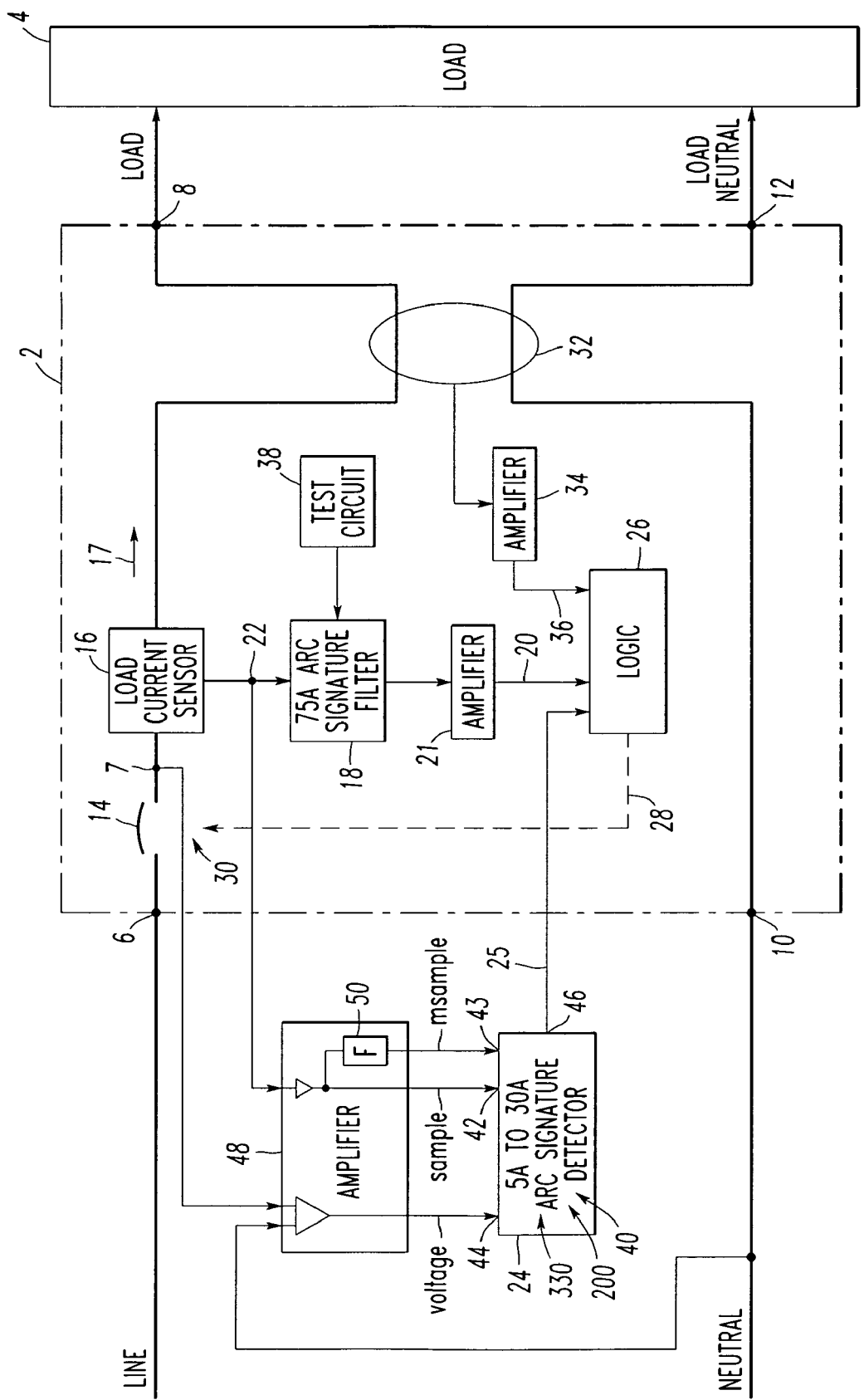
FIG. 1 is a block diagram of a single pole branch/feeder arc fault circuit interrupter in accordance with the present invention.

Referring to FIG. 1, an arc fault circuit interrupter, such as circuit breaker 2, is for an electrical circuit associated with one or more different types of loads, such as load 4. The circuit breaker 2 includes a line terminal 6 and a load terminal 8. If the circuit breaker 2 is optionally adapted to provide ground fault protection, then it also includes a line neutral terminal 10 and a load neutral terminal 12. As is conventional, separable contacts 14 are electrically connected between the line terminal 6 and the load terminal 8. A load current sensor 16 is adapted to sense current 17 flowing between the line and load terminals 6,8 and through the separable contacts 14. Here, the current 17 is associated with one of the different types of loads and includes a plurality of alternating current line cycles. As is also conventional, a first arc fault detection circuit 18 (e.g., a 75 A arc signature filter) is adapted to generate a first trip signal 20 through amplifier 21 responsive to the sensed current 22 from the current sensor 16. Suitable arc fault detection circuits, such as the circuit 18, are disclosed, for example, in U.S. Pat. Nos. 5,224,006; 5,691,869; and 5,818,237, which are hereby incorporated by reference herein.

A second arc fault detection circuit 24 (e.g., 5 A to 30 A arc signature detector) is adapted to collect a plurality of samples 56 (FIG. 2A) of the sensed current 42 for the line cycle 61 (FIG. 2A), determine a first slope 308 (FIG. 9) of the sensed current at about the negative zero crossing 61NZ (FIG. 2A) of the line voltage 44 (FIG. 2A), determine a magnitude of one of the samples at about the zero crossing, determine a second slope 310 (FIG. 9) of the sensed current at another one of the samples having about the same magnitude, the first slope 308 (e.g., negative) being opposite in polarity with respect to the second slope 310 (e.g., positive), calculate a difference 321 (FIG. 10) between the first and second slopes 308,310, and generate the trip signal 25 as a function of the difference 321.

Although not required, the circuit breaker 2 may include a ground fault current sensor 32 (e.g., personnel protection; 5 mA; equipment protection; 30 mA) and a corresponding amplifier 34, which generates a ground fault trip signal 36 to trip circuit 26. As is also not required, the first arc fault detection circuit 18 includes a suitable test circuit 38, which generates the first trip signal 20 in response to a user request.

The trip circuit 26 is adapted to generate a third trip signal 28 responsive to the first and second trip signals 20,25. An operating mechanism 30 is adapted to open the separable contacts 14 responsive to the third trip signal 28.

The second arc fault detection circuit 24 may be, for example, a suitable PIC® model microprocessor (µP) as marketed by Microchip Technology Inc. of Chandler, Ariz., including, for example, internal memory for a suitable firmware routine 40, plural analog inputs, such as 42,43,44, and plural I/O lines, such as output 46. Upstream of the second arc fault detection circuit 24 is a suitable amplifier circuit 48, which buffers the analog sensed current 22 from the load current sensor 16 to the first analog input 42 (sample), which buffers and filters the analog sensed current 22 from the load current sensor 16 to the second analog input 43 (msample), and which buffers the switched line voltage 7 from the load side of the separable contacts 14 to the third analog input 44 (voltage). Preferably, the amplifier circuit 48 includes a filter circuit (F) 50, which is a low pass circuit having a cutoff frequency of about 300 Hz for the second analog input 43.

Figure 2A:
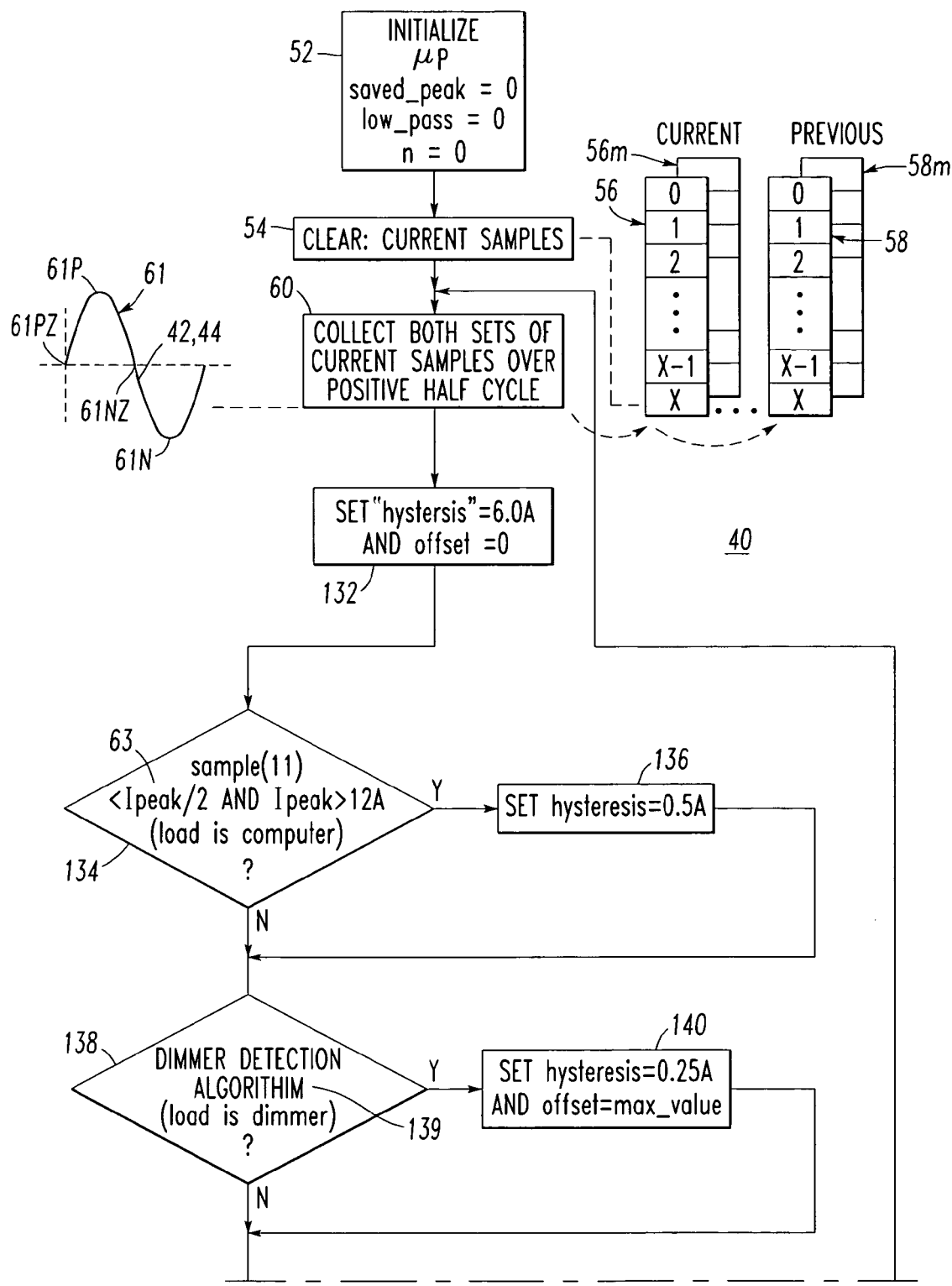
FIGS. 2A-2B form a flowchart of a current sampling routine to collect current samples and determine a hysteresis value for the processor of FIG. 1.
Figure 2B:
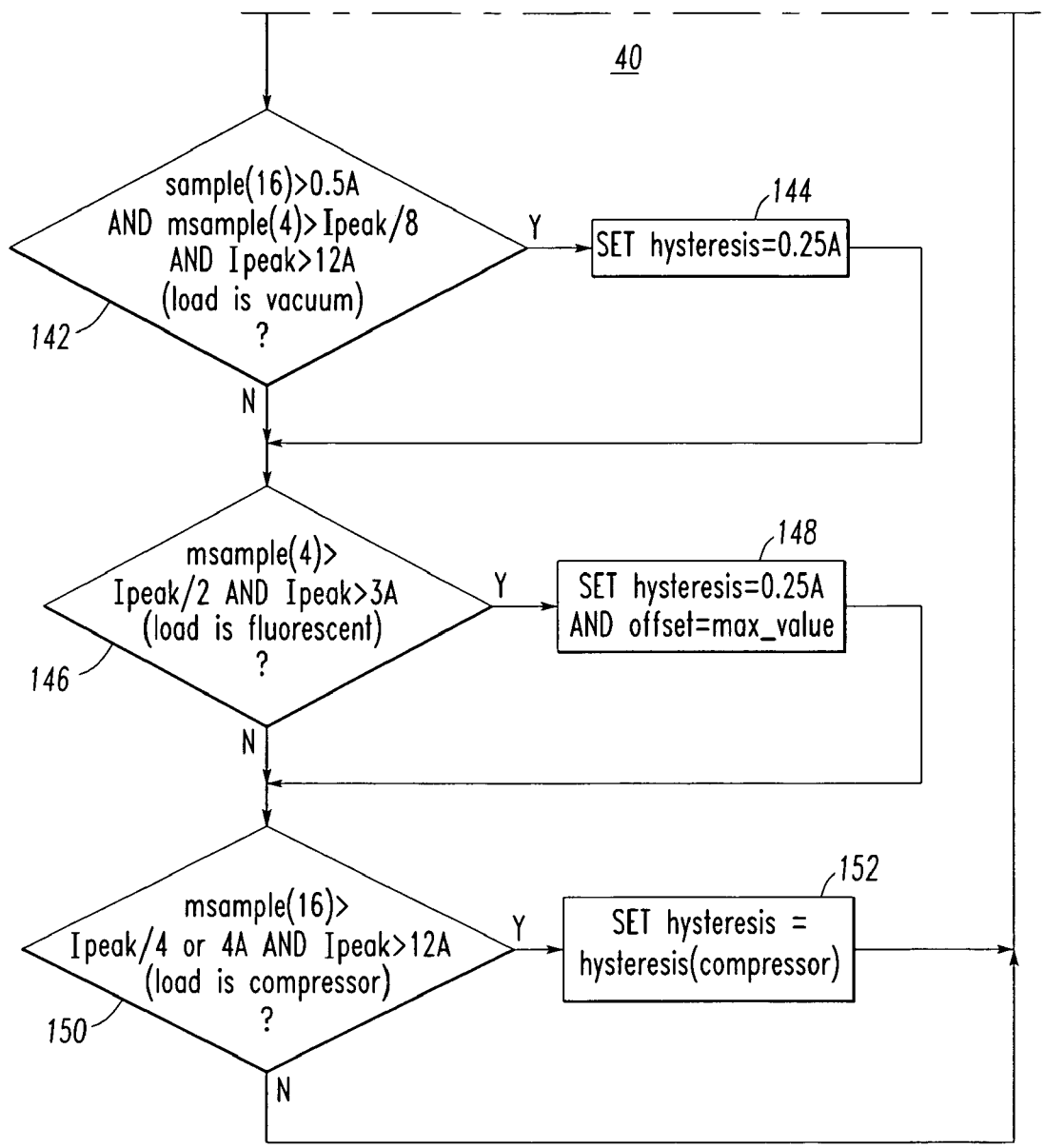

FIGS. 2A-2B show a current sampling routine 40 for the processor 24 of FIG. 1. First, at 52, the routine 40 initializes the processor 24 of FIG. 1 and variables (saved_peak, low_pass and n of FIG. 4), before it clears, at 54, current sample arrays 56,56m,58,58m. Next, at 60, the routine 40 copies the values from the current arrays 56,56m to the previous arrays 58,58m, respectively. Then, the routine 40 collects the two current sets of the current samples in the arrays 56 (sample), 56m (msample) from the respective analog inputs 42,43 of FIG. 1. In this example, a count (e.g., x+1) of the samples of the sensed current for a current one of the line cycles is about 19 (e.g., sample #0 (or sample (0)) through and including sample #18 (or sample (18)). The voltage line cycles, such as 61, include a positive half cycle 61P and a negative half cycle 61N. Preferably, the routine 40 collects the samples of the sensed current for the current one of the line cycles substantially during the positive half cycle 61P and during the start of the negative half cycle 61N, and processes the samples of the sensed current for the current one of the line cycles, in order to generate the second trip signal 25 (FIG. 1) during the negative half cycle 61N. In this example, the line voltage and the sensed current are in phase, and the routine 40 collects about 19 of the samples of the sensed current for the current one of the line cycles at a rate of about 32 samples per line cycle. Alternatively, the sensed current may lead or lag the line voltage. The routine 40 collects a first one of the samples (sample #0) of the sensed current at about the positive zero crossing 61 PZ, as sensed from analog input 44 (voltage) (FIG. 1). For example, the processor 24 employs an edge-triggered interrupt (not shown) that responds to the positive zero crossing 61PZ.

For example, if N is an integer, such as 8, then the routine 40 collects about 2N plus three (=19) of the samples of the sensed current for the current one of the line cycles. The routine 40 collects an (N+1)th one (e.g., 9th) (e.g., sample #8) of the samples of the sensed current at about the positive peak of the positive half cycle 61P of the line voltage. The capacitive di/dt is maximum (positive) at the line voltage positive peak, while resistive di/dt is zero. The routine collects a (2N+1)th one (e.g. 17th) (e.g., sample #16) of the samples of the sensed current at about the negative zero crossing 61NZ. In this example, two additional samples (e.g., sample #17 and sample #18) are collected during the negative half cycle 61N.

Although the processor 24 of FIG. 1 inputs, converts and stores the values substantially during the positive half cycle 61P plus a relatively small portion of negative half cycle 61N, with subsequent processing in the subsequent portion of negative half cycle 61N, this could be reversed. The processor 24 provides a suitable analog-to-digital conversion (e.g., without limitation, about 16 counts per ampere (peak)) of the sensed current values 22 (FIG. 1) to the digital values in the arrays, such as 56.

Unless suitable settings are provided, non-arcing loads may mask an arc fault. Hence, the routine 40 determines whether the load is one of a computer, a dimmer, a vacuum cleaner, a fluorescent light or a compressor. First, at 132, default values of "hysteresis" (e.g., 6.0 A) and "offset" (e.g., 0 A) are initialized. Next, at 134, it is determined if the load is a computer by checking if the twelfth sample (e.g., sample (11)) in the current (unfiltered) array 56 (FIG. 2A) is less than Ipeak/2 and if Ipeak is greater than 12 A. If so, then at 136, "hysteresis" is set to 0.5 A and execution resumes at 138. On the other hand, if the test failed at 134, then at 138, it is determined if the load is a dimmer by employing a suitable dimmer detection algorithm 139. If so, then at 140, "hysteresis" is set to 0.25 A, "offset" is set to a maximum value (e.g., about one half of the rated trip current) and execution resumes at 142. On the other hand, if the test failed at 138, then at 142, it is determined if the load is a vacuum cleaner by checking if the seventeenth sample in the current (unfiltered) array 56 is greater than 0.5 A, if the fifth sample in the current (filtered) array 56m (FIG. 2A) is greater than Ipeak/8, and if Ipeak is greater than 12 A. If so, then at 144, "hysteresis" is set to 0.25 A and execution resumes at 146. On the other hand, if the test failed at 142, then at 146, it is determined if the load is a fluorescent light by checking if the fifth sample in the current (filtered) array 56m is greater than Ipeak/2 and if Ipeak is greater than 3 A. If so, then at 148, "hysteresis" is set to 0.25 A, "offset" is set to the maximum value (e.g., about one half of the rated trip current) and execution resumes at 150. On the other hand, if the test failed at 146, then at 150, it is determined if the load is a compressor by checking if the seventeenth sample in the current (filtered) array 56m is greater than Ipeak/4 or 4 A, and if Ipeak is greater than 12 A. If so, then at 152, "hysteresis" is set to "hysteresis(compressor)" as determined by algorithm 200 (FIG. 4) and execution resumes at 60. In this hierarchy, a compressor, for example, overrides any prior settings of the hysteresis.

Figure 3:
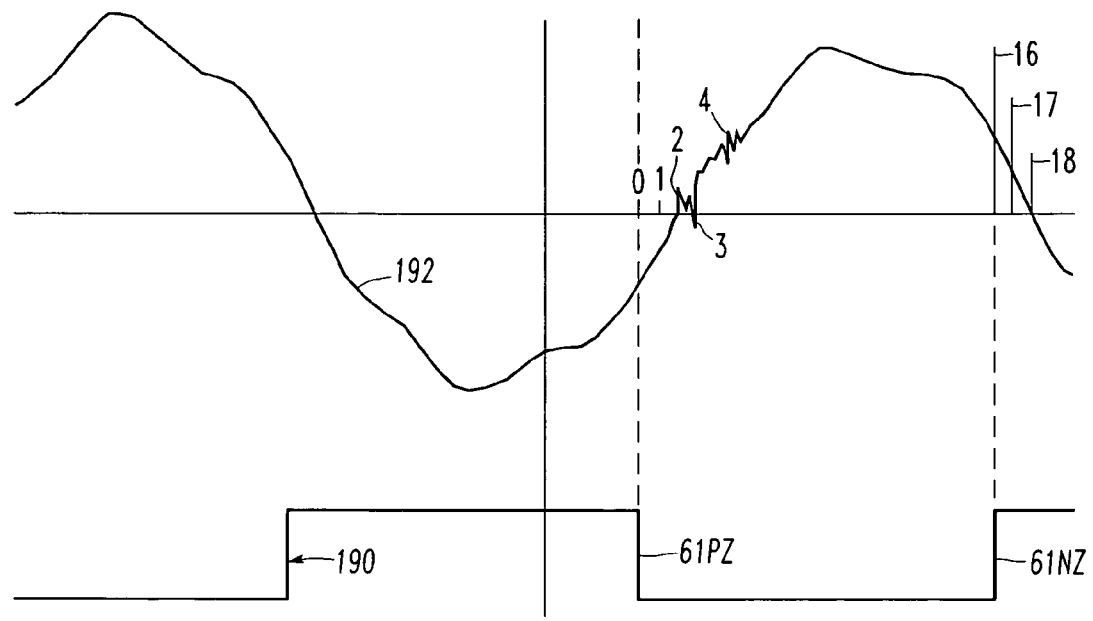
FIG. 3 is a plot of alternating current voltage zero crossings and current for a capacitor start (air compressor type) motor.

FIG. 3 is a plot of alternating current voltage zero crossings 190 and current 192 (e.g., analog sensed current 22 of FIG. 1) for a capacitor start (air compressor type) motor (not shown). The alternating current voltage zero crossings 190, which are shown as an inverted digital signal, include the positive zero crossing 61PZ and negative zero crossing 61NZ of FIG. 2A. For convenience of reference, the approximate sample times of the samples: sample (0), sample (1), sample (2), sample (3), sample (4), sample (16), sample (17), and sample (18), are shown.

Figure 4:
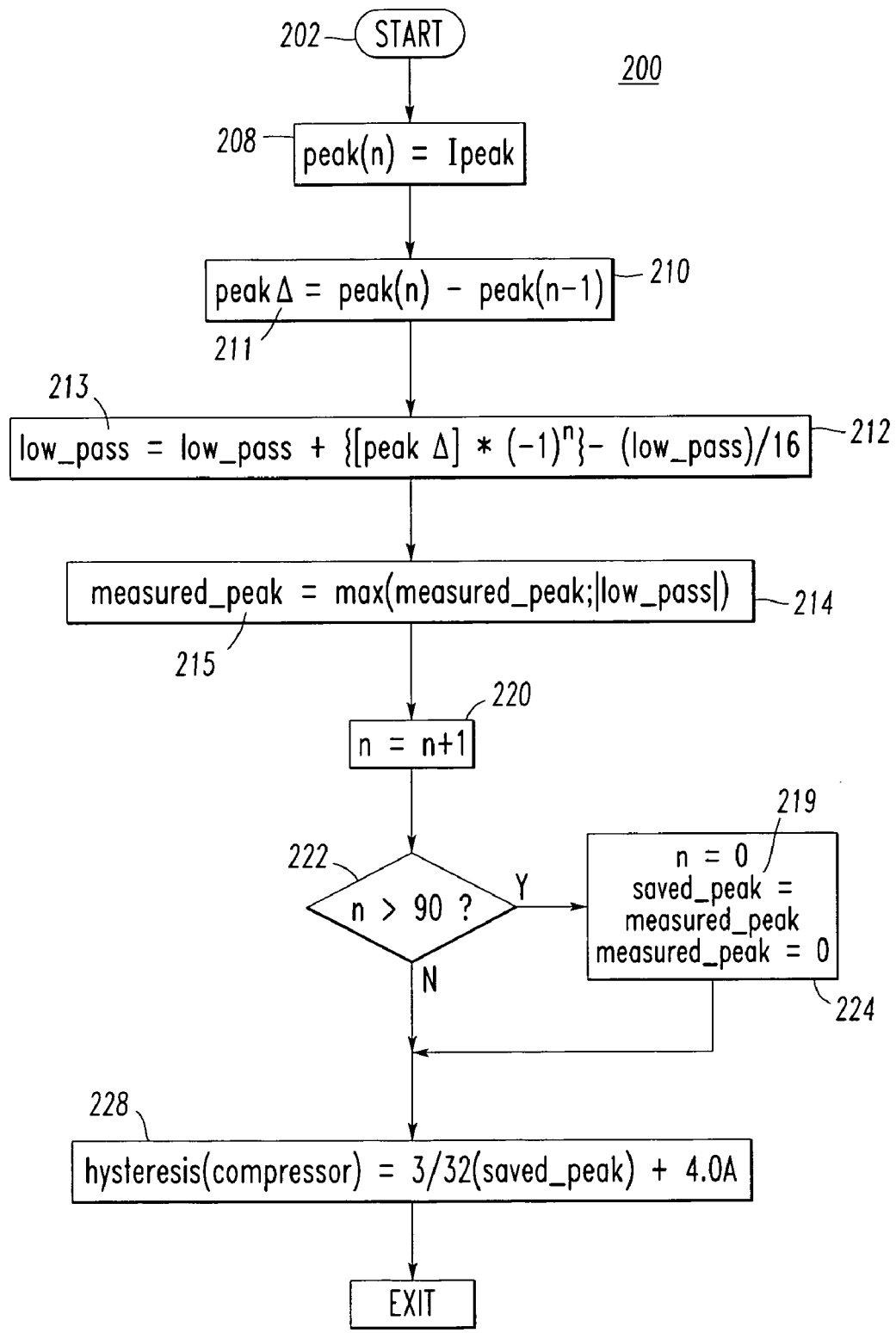
FIG. 4 is a flowchart of an algorithm to detect and measure the periodic noise level of a compressor load, while ignoring noise attributed to arc fault conditions, for the processor of FIG. 1.

FIG. 4 shows an algorithm 200 to detect and measure the periodic noise level of a compressor load (e.g., ½ frequency sub-harmonic (e.g., 30 Hz subharmonic for a 60 Hz system) current amplitude modulation), such as 4, while ignoring noise attributed to arc fault conditions, for the arc fault detection circuit 24 of FIG. 1. After starting at 202, at 208, the array, peak(i), is updated as shown in Equation 1:

$$\text{peak}(n) = \text{Ipeak} \tag{Eq. 1}$$

wherein:

n is the line cycle number (e.g., n=1, 2, 3, . . . 90).

Next, at 210, the cycle-to-cycle peak difference, peakΔ 211, is determined from Equation 2:

$$\text{peak}\Delta = \text{peak}(n) - \text{peak}(n-1) \tag{Eq. 2}$$

Then, step 212 measures and low-pass filters the periodic cycle-to-cycle variation in the peak current 63 from Equations 3A or 3B:

$$\text{low\_pass} = \text{low\_pass} + \{[\text{peak}(n) - \text{peak}(n-1)]^*(-1)^n\} - (\text{low\_pa 16} \tag{Eq. 3A}$$

$$\text{low\_pass} = \text{low\_pass} + \{[\text{peak}\Delta]^*(-1)^n\} - (\text{low\_pass})/16 \tag{Eq. 3B}$$

wherein:

low_pass 213 is initially set to zero at 52 of FIG. 2A.

Next, step 214 determines the measured peak, measured_peak 215, of the absolute value of low_pass 213, |low_pass|. This value is either the value of measured_peak 215 from the previous line cycle, or, else, is the value of |low_pass| for the present line cycle if that value is greater than the value of measured_peak 215 from the previous line cycle.

Then, the integer, n, is incremented at 220. Next, at 222, if n is not greater than 90, in this example, then execution resumes at 228. Otherwise, at 224, the saved value, saved_peak 219, is set equal to the measured_peak 215, and the line cycle number n and the measured_peak 215 are set to zero. Then, at 228, the variable hysteresis(compressor) is set to 3/32 times the variable saved_peak plus a fixed value of 4.0 A. The hysteresis(compressor) value is employed to desensitive the hysteresis value of step 152 of the routine 40 of FIG. 2B.

The saved value, saved_peak 219, may also advantageously be employed to classify the load as, or to further confirm the load to be, a compressor, at step 228, whenever (saved_peak)/16 is greater than a suitable threshold (e.g., without limitation, 1 A).

Figure 5:
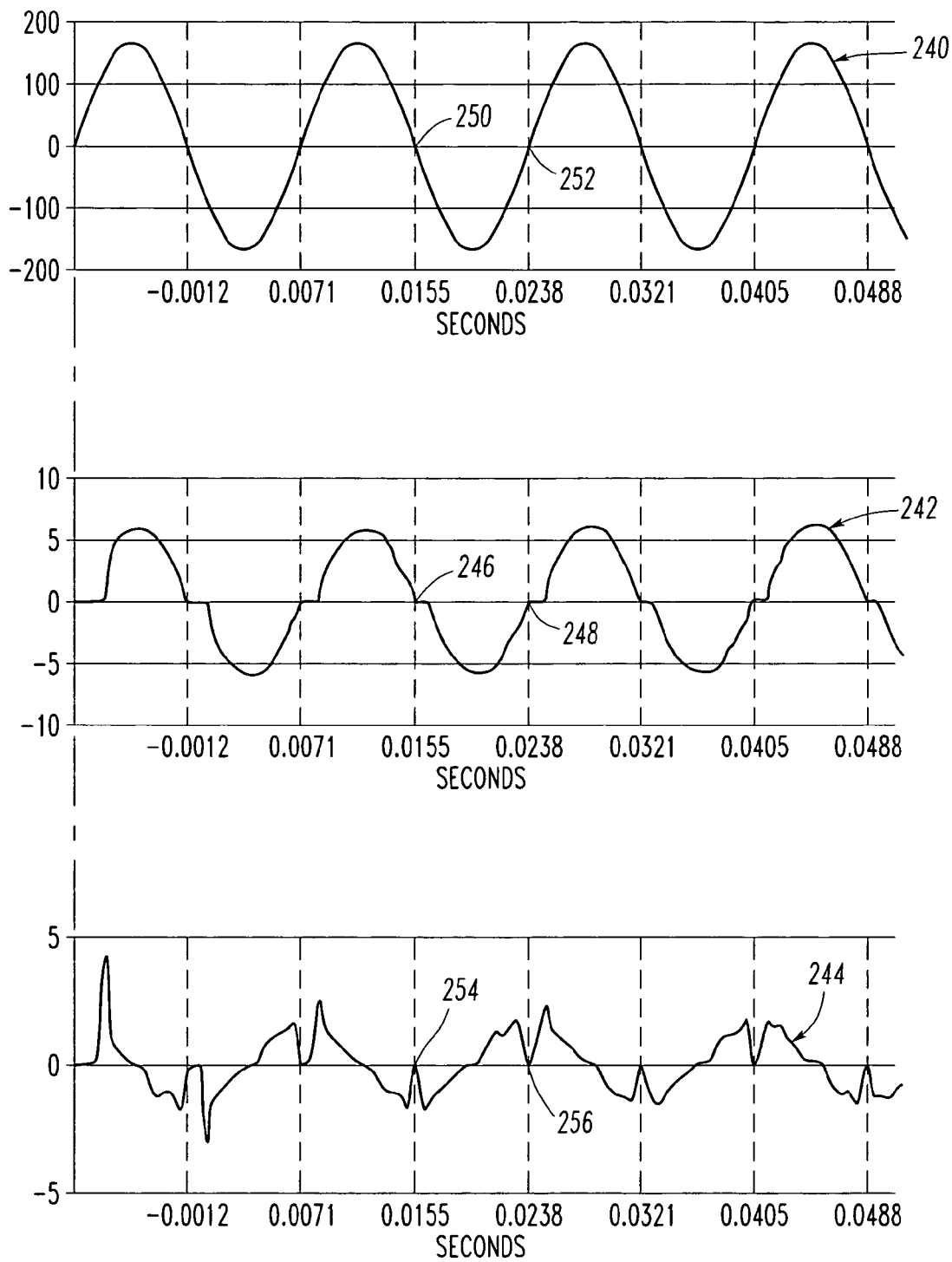
FIG. 5 plots line voltage, arcing current and the derivative of arcing current versus time as generated by a copper-carbon opposing electrode tester.

FIG. 5 plots an example of line voltage 240, arcing current 242 and the derivative 244 of arcing current versus time as generated by a copper-carbon opposing electrode tester with resistive load (not shown). Typically, the arcing current 242 is characterized by "flat spots" or intervals of zero current, such as 246,248, around the voltage zero crossings, such as 250,252, respectively. By definition, the derivative of the arcing current 242 during the "flat spots" is zero, which creates a characteristic "notching" 254,256 in the derivative 244 at the respective voltage zero crossings, such as 250, 252.

Figure 6:
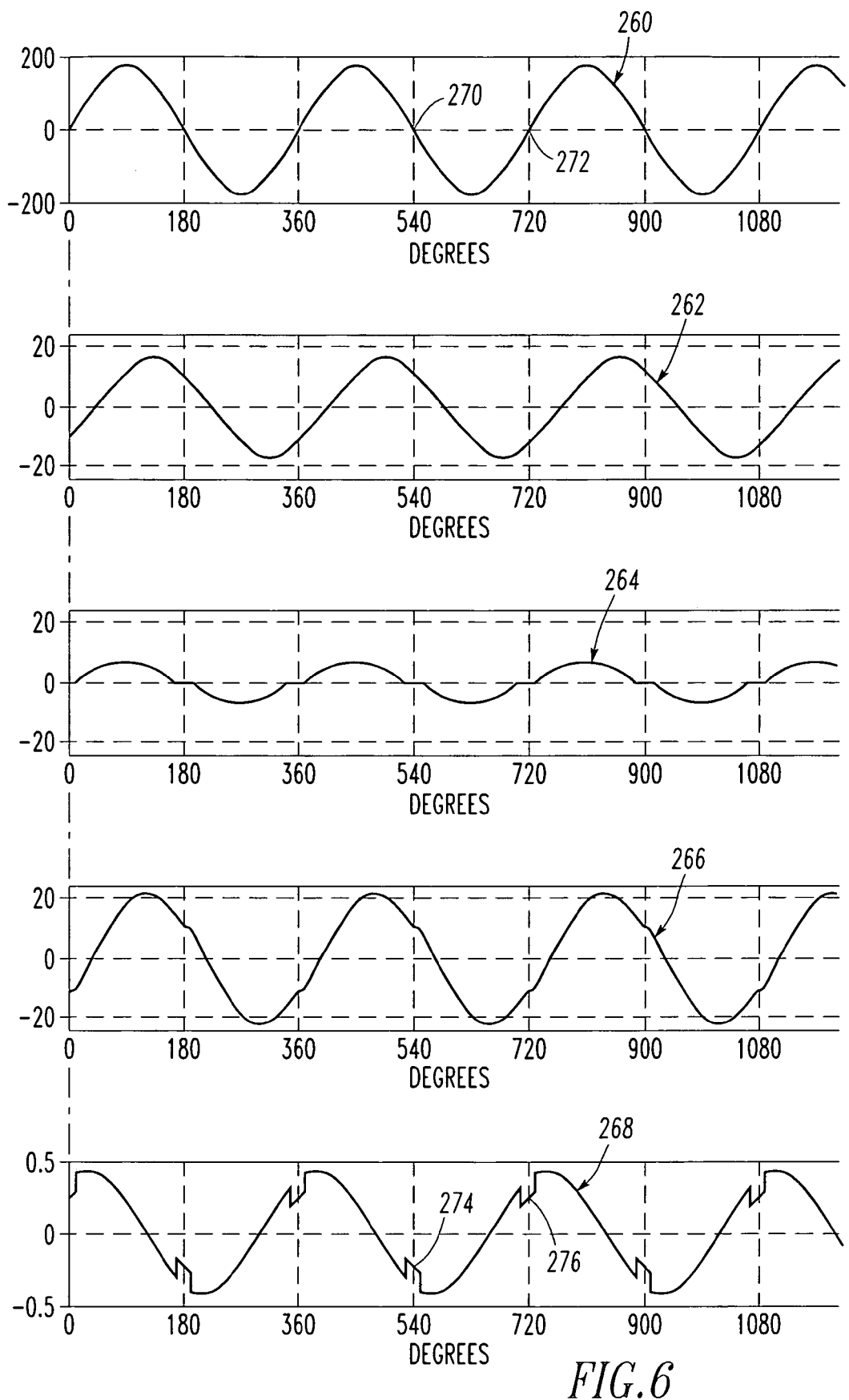
FIG. 6 plots a simulation of line voltage, inductive load current, arcing load current, total load current and the derivative of total load current versus time for inductive current in parallel with arcing resistive current.

FIG. 6 plots simulations of line voltage 260, inductive load current 262, resistive arcing load current 264, total load current 266 and the derivative 268 of total load current versus time for inductive current in parallel with arcing resistive current. In this simulation, the total load current 266 is the sum of the inductive and arcing load currents 262,264. Near the voltage zero crossings, such as 270,272, when the derivative (not shown) of the arcing load current 264 is equal to zero, the derivative 268 is equivalent to the derivative (not shown) of the inductive load current 262. Thus, the zero value of the arcing load current derivative (not shown) near the voltage zero crossings, such as 270, 272, creates respective "notches," such as 274,276, in the derivative 268.

Figure 7:
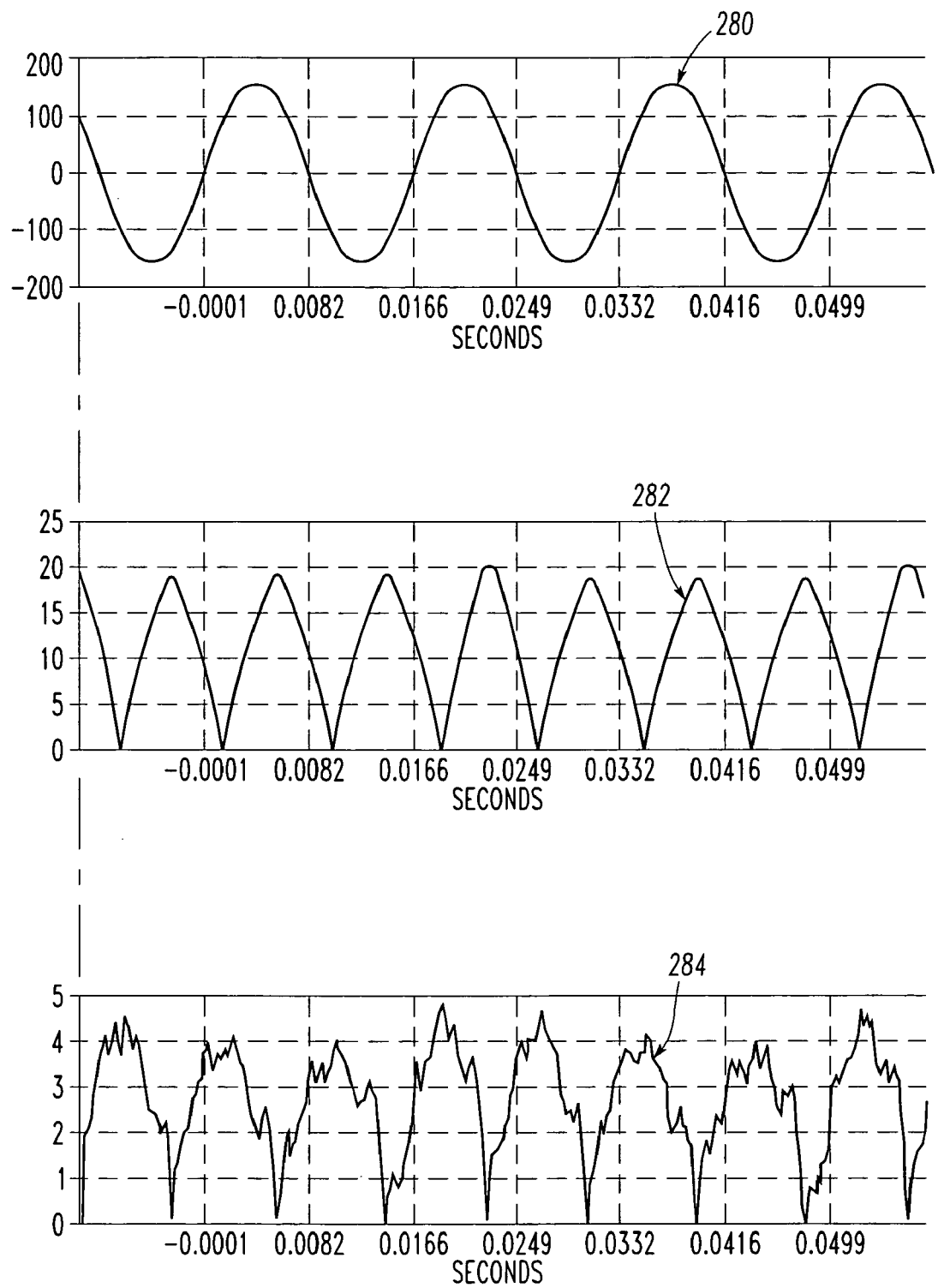
FIG. 7 plots line-to-neutral voltage, the absolute value of total load current and the absolute value of the derivative of total load current versus time for a compressor load placed in parallel with a 5 A resistive load in which there is no arcing.

FIG. 7 plots line-to-neutral voltage 280, the absolute value 282 of total load current, and the absolute value 284 of the derivative of total load current versus time for a compressor load (not shown) placed in parallel with a 5 A resistive load (not shown) in which there is no arcing. The total load current is the sum of the compressor current and the 5 A resistive load current. From the relationship between the line voltage 280 and the absolute total load current 282, the total load current (i.e., the sum of the resistive and inductive currents) is net inductive. Also, both the amplitude and the phase of the total load current change from cycle to cycle. From the derivative absolute value 284, it is apparent that there is a relatively significant amount of harmonic content in the total load current, even when there is no arcing present.

Figure 8:
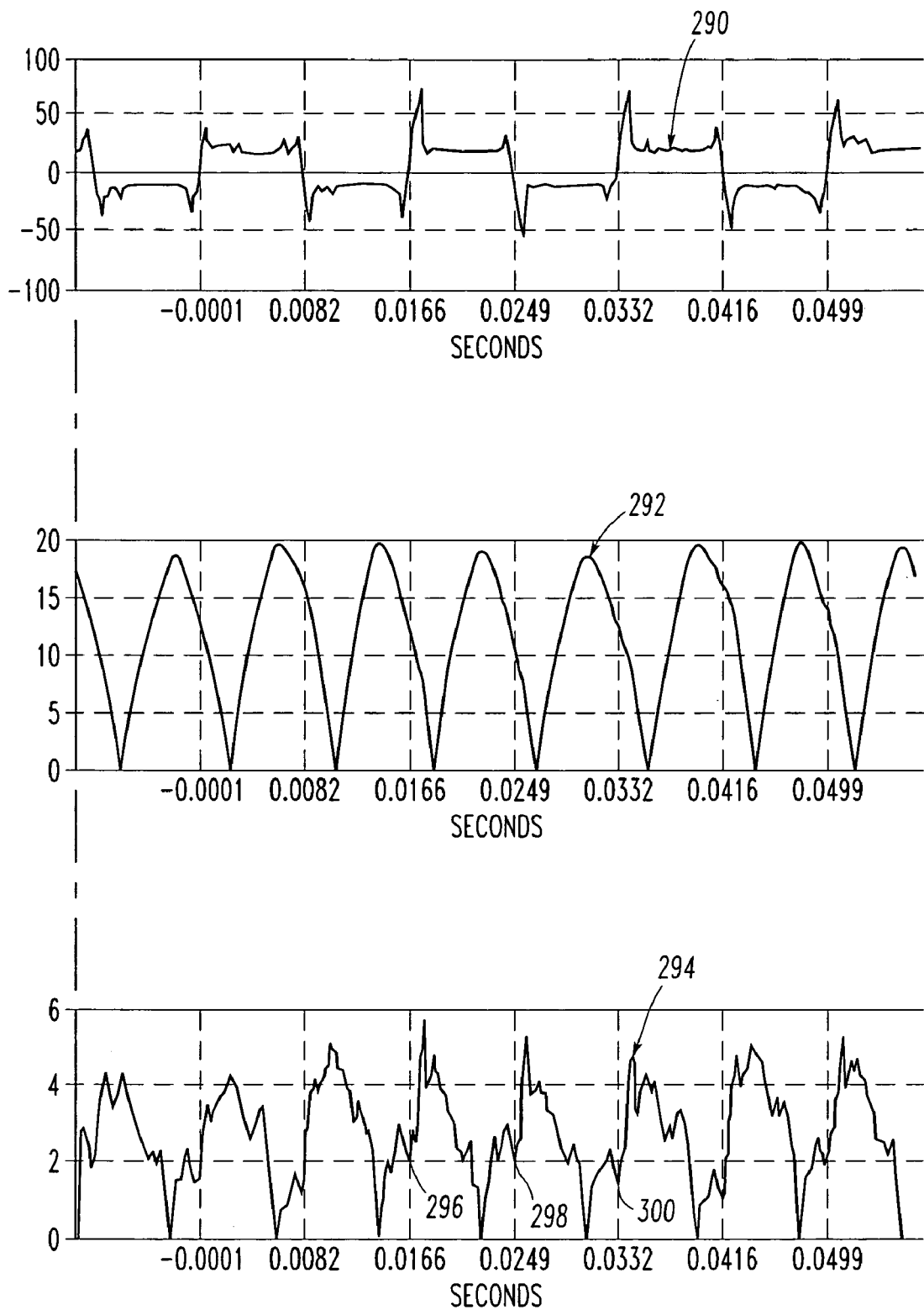
FIG. 8 plots arcing voltage, the absolute value of total load current and the absolute value of the derivative of total load current versus time for a compressor placed in parallel with a 5 A resistive load in which there is arcing.

FIG. 8 plots arcing voltage 290, the absolute value 292 of total load current (i.e., the sum of the arcing current and compressor current), and the absolute value 294 of the derivative of total load current versus time for a compressor (not shown) placed in parallel with a 5 A resistive load (not shown) in which there is arcing. Upon comparing the derivative absolute values (|di/dt|) 284 and 294 shown in respective FIGS. 7 and 8, it may be seen that there are "notches," such as 296,298,300 in the total current derivative 294 at the voltage zero crossings in FIG. 8. These "notches" are the byproduct of the "flat spots" (or intervals of zero current) that occur in the arc current (not shown) during the voltage zero crossings. As will be discussed, below, in connection with FIGS. 9, 10 and 11A-11C, these di/dt "notches" are the basis for detecting arc faults in parallel with compressors.

Figure 9:
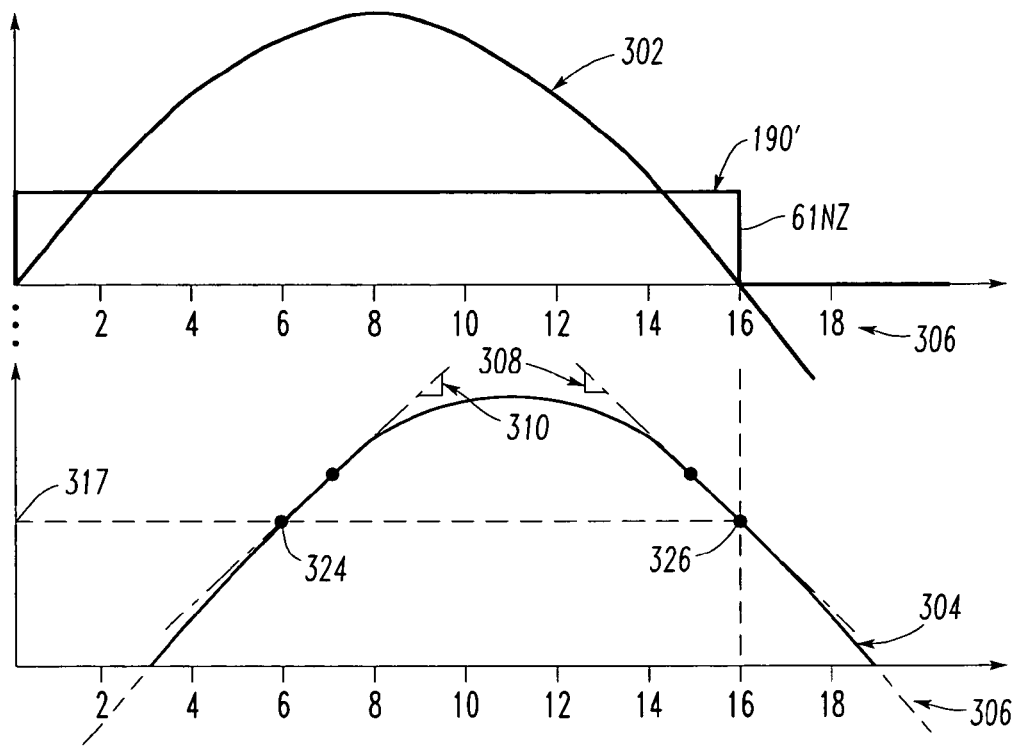
FIG. 9 plots line voltage, a voltage zero crossing detector signal, line current, samples of sensed current and two slopes as determined by the processor of FIG. 1.

FIG. 9 plots line voltage 302, a voltage zero crossing detector signal 190', which is inverted with respect to the zero crossings 190 of FIG. 3, line current 304, samples 306 of the analog sensed current 22 (FIG. 1), and the two slopes 308,310 determined by the processor 24 of FIG. 1. Also referring to FIG. 10, at 312, the second arc fault detection circuit 24 (FIG. 1) collects the samples 56 (FIG. 2A) of the sensed current 42 for the line cycle 61 (FIG. 2A). Next, at 314, the circuit 24 determines the first slope 308 of the sensed current at about the negative zero crossing 61NZ of the line voltage 302, and, at 316, determines a magnitude 317 of one of the samples 326 at about the zero crossing. Then, at 318, the circuit 24 determines a second slope 310 of the sensed current at another one of the samples 324 having about the same magnitude 317. The first slope 308 (e.g., negative) is opposite in polarity with respect to the second slope 310 (e.g., positive). Next, at 320, the circuit 24 calculates a difference 321 between the first and second slopes 308,310, and, at 322, generates the trip signal 25 (FIG. 1) as a function of the difference 321.

For example, step 314 determines the first slope 308, $\Delta i_{zc}$, of the current at the voltage zero crossing 61NZ from Equation 4:

$$\Delta i_{zc} = i[15] - i[16] \tag{Eq. 4}$$

wherein:

i[15] is the 16$^{th}$ current sample in the array 56 (sample) from the analog input 42 of FIG. 1; and i[16] is the 17$^{th}$ current sample in the array 56 (sample) from the analog input 42 of FIG. 1 at about the negative zero crossing 61NZ.

Step 316 determines which sample, such as, 324 (although i[6] is shown in this example, it will be appreciated that a wide range of different samples may be employed), i[match]=sample[match], on the rising edge of the current waveform is approximately equal in amplitude to the sample 326 on the falling edge of the current waveform at the voltage zero crossing 61NZ.

Step 318 calculates the second slope 310, $\Delta i_m$, from Equation 5:

$$\Delta i_m = i[match+1] - i[match] \quad (Eq. 5)$$

wherein:

i[match+1] is the next current sample in the array 56 (sample) from the analog input 42 of FIG. 1 after the sample, i[match].

Step 320 calculates the difference 321, $\Delta i\_difference$, between the magnitudes of rising edge slope 310 and the falling edge slope 308 from Equation 6:

$$\Delta i\_difference = \Delta i_m - \Delta i_{zc} \quad (Eq. 6)$$

Example 1

For example, at 320, if the difference 321, $\Delta i\_difference$, is greater than a first threshold, then an arc is assumed to occur during the current line cycle, and a suitable increment is added to an accumulator (e.g., a trip bucket). This difference 321 deals with the detection of the arc and is based on the difference between the rising edge slope 310 and the falling edge slope 308 of the current. Otherwise, if the test fails, then the accumulator is decremented (e.g., at 410 of FIG. 11C). For example, at 322, if the accumulator exceeds a second threshold, then the trip signal 25 is asserted to trip the circuit breaker 2.

Example 2

One example of the first threshold of Example 1 is a suitable fixed value (e.g., empirical).

Example 3

Another example is a threshold value based on current amplitude. For instance, this value may be proportional to the maximum current amplitude, Ipeak 63 (FIG. 2A), during the corresponding half-cycle. In this case, as the amplitude of the current increases, then a greater difference in the rising edge slope 310 and the falling edge slope 308 is needed to indicate an arc.

Example 4

A further example is a threshold or hysteresis value (e.g., without limitation, (saved_peak 219)/16) (FIG. 4) based upon "compressor rumble," which is the natural modulation of the current amplitude of a compressor in steady-state. Compressors which rumble relatively more require a greater difference in slope to indicate an arc.

Example 5

The accumulator increment of Example 1 deals with the "accumulation of chaos," which is used to trip the circuit breaker 2 (FIG. 1). Examples of the accumulator increment include a suitable fixed value (e.g., empirical), a function of the current amplitude, Ipeak 63, and a function of the difference 321, $\Delta i\_difference$. For instance, putting something proportional to the current amplitude 63 into the trip bucket means that the circuit breaker 2 will trip relatively faster at higher current amplitudes. In a similar fashion, putting something proportional to the difference 321, $\Delta i\_difference$, means that a more chaotic arc will cause the circuit breaker 2 to trip faster.

Figure 11A:
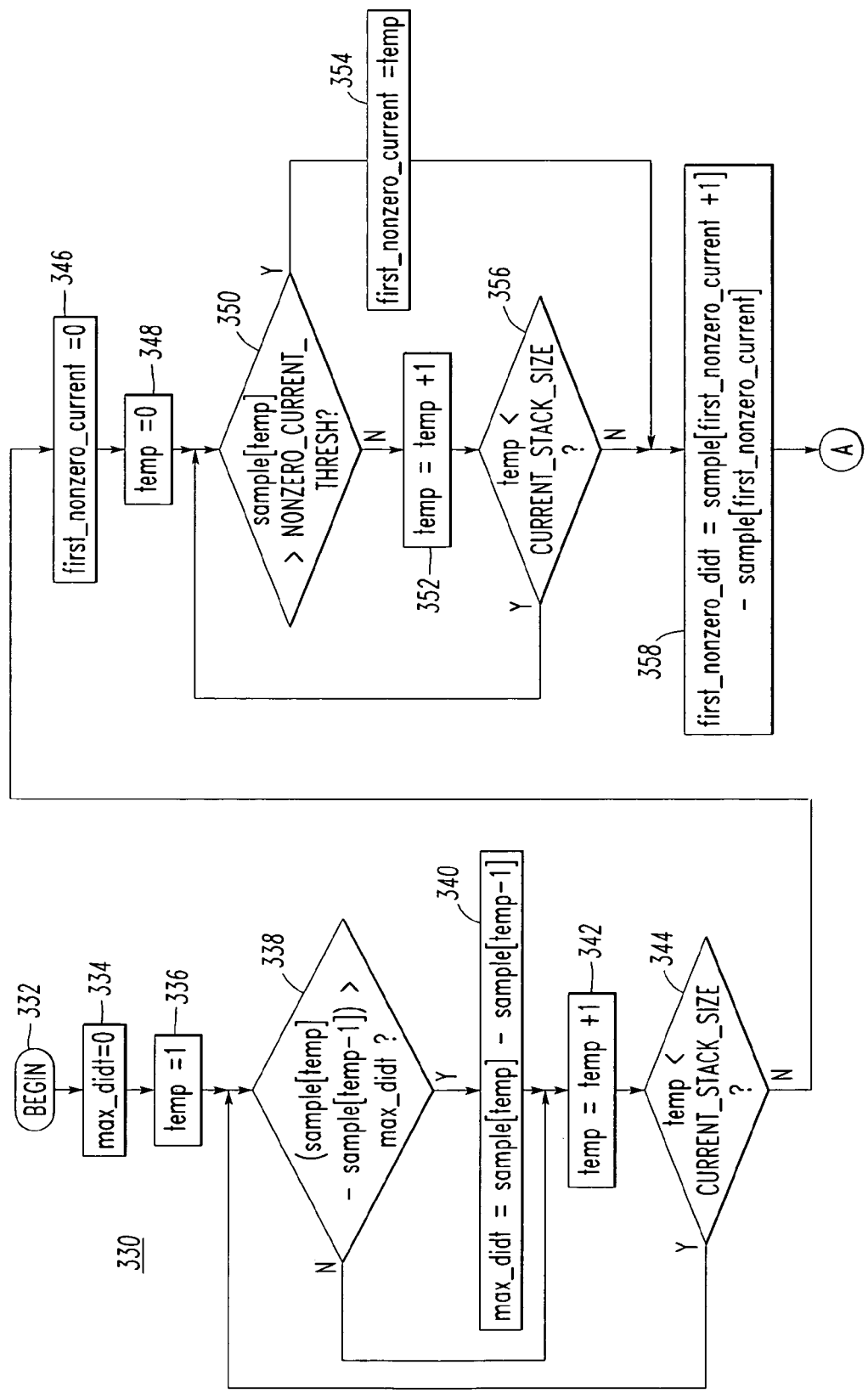
FIGS. 11A-11C form a flowchart of a routine to determine the slopes of FIG. 9 and generate the trip signal by the processor of FIG. 1.
Figure 11B:
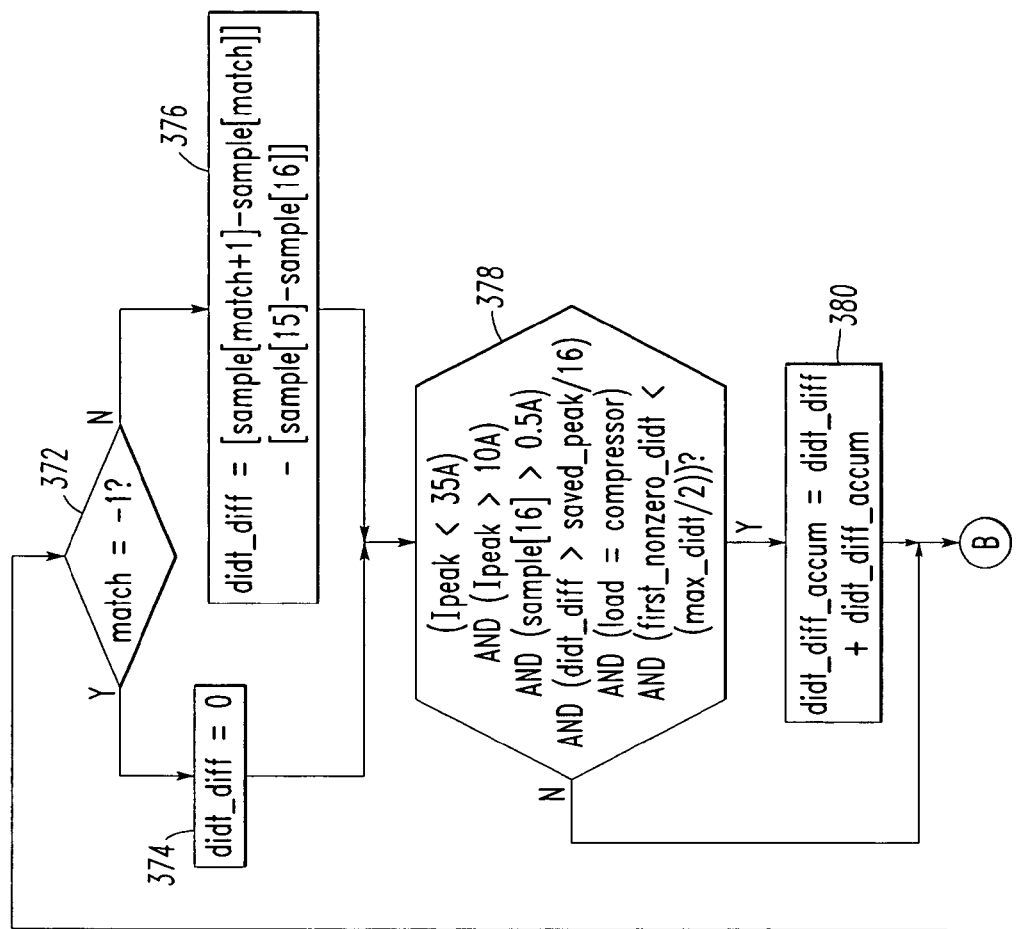
Figure 11B:
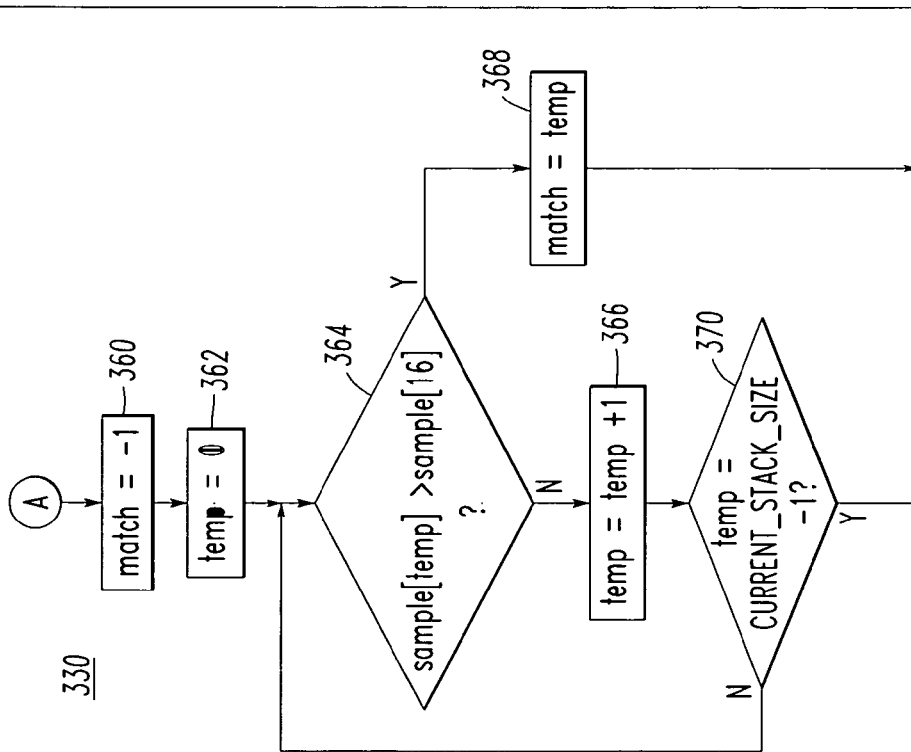
Figure 11C:
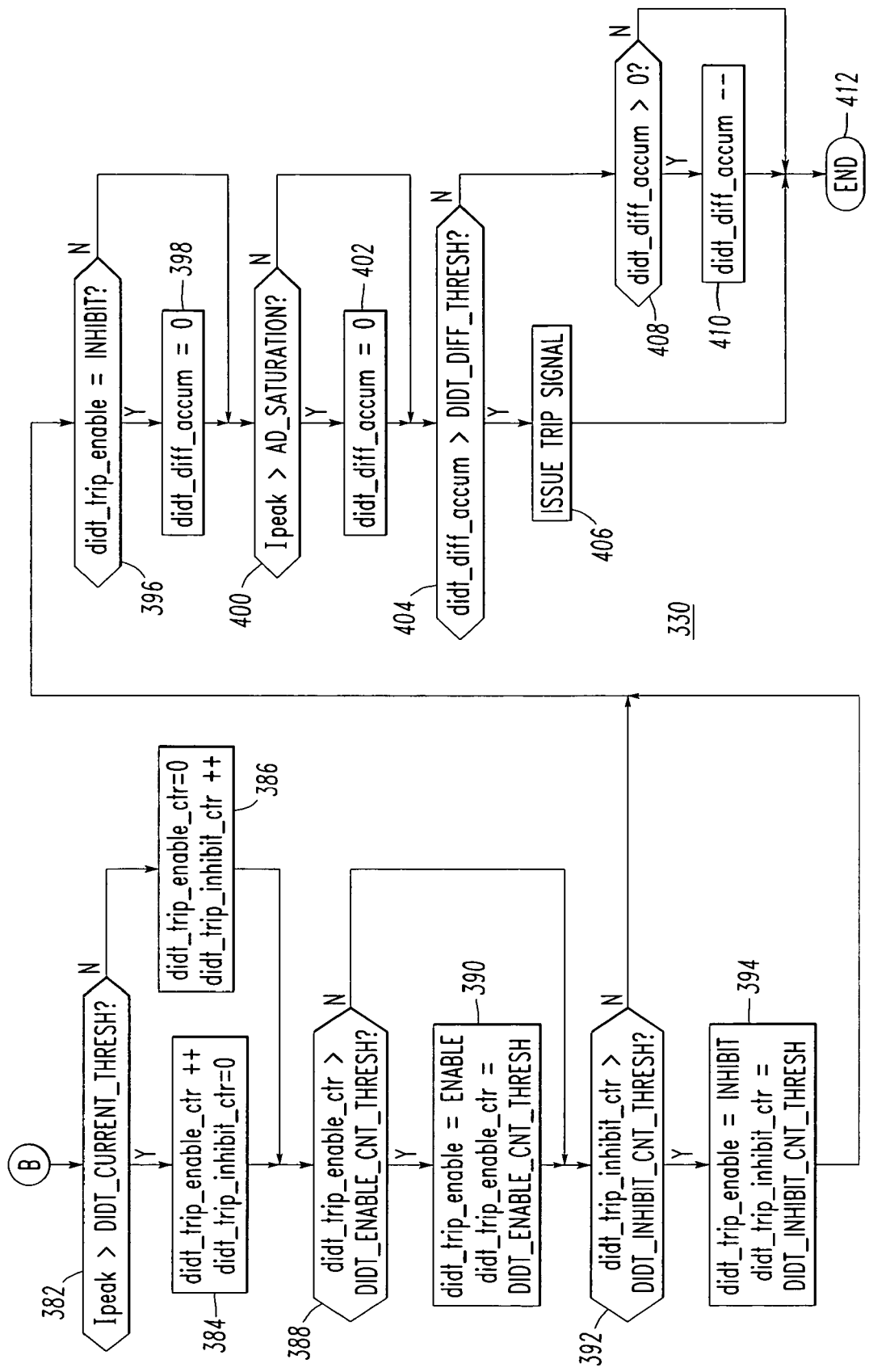

FIGS. 11A-11C form a flowchart of a routine 330 to determine the slopes 308,310 of FIG. 9 and generate the trip signal 25 by the processor 24 of FIG. 1. After the routine 330 begins, at 332, a value, max_didt is set to 0, at 334, and an integer, temp, is set to 1, at 336. Next, at 338, it is determined whether the difference between sample[temp] and sample[temp−1] is greater than max_didt. If so, at 340, the variable max_didt is set equal to sample[temp] minus sample[temp−1]. Otherwise, or after 340, the integer temp is incremented at 342. At 344, if temp is less than the current stack size (CURRENT_STACK_SIZE) of the sample array 56 (FIG. 2A) (e.g., without limitation, about 17 in this example), then step 338 is repeated.

On the other hand, if all of the samples in the array 56 for the present line cycle have been considered, then, at 346, the variable first_nonzero_current is set to 0, and, at 348, the integer temp is set to 0. Next, at 350, it is determined if sample[temp] is greater than a suitable non-zero current threshold (NONZERO_CURRENT_THRESH) (e.g., without limitation, 0.5 A). If not, then temp is incremented at 352. Otherwise, the variable first_nonzero_current is set equal to temp, at 354, before step 358 is executed. After 352, it is determined if temp is less than the current stack size. If so, then step 350 is repeated. Otherwise, step 358 is executed, which sets the variable first_nonzero_didt equal to the difference between sample[first_nonzero_current+1] and sample[first_nonzero_current].

In this example, the maximum positive value of di/dt, max_didt, is determined for the present set of 17 positive half-cycle current samples from the array 56 (sample) from the analog input 42 of FIG. 1. Also, the slope of the current on its positive going zero crossing, first_nonzero_current, is also determined.

Figure 10:
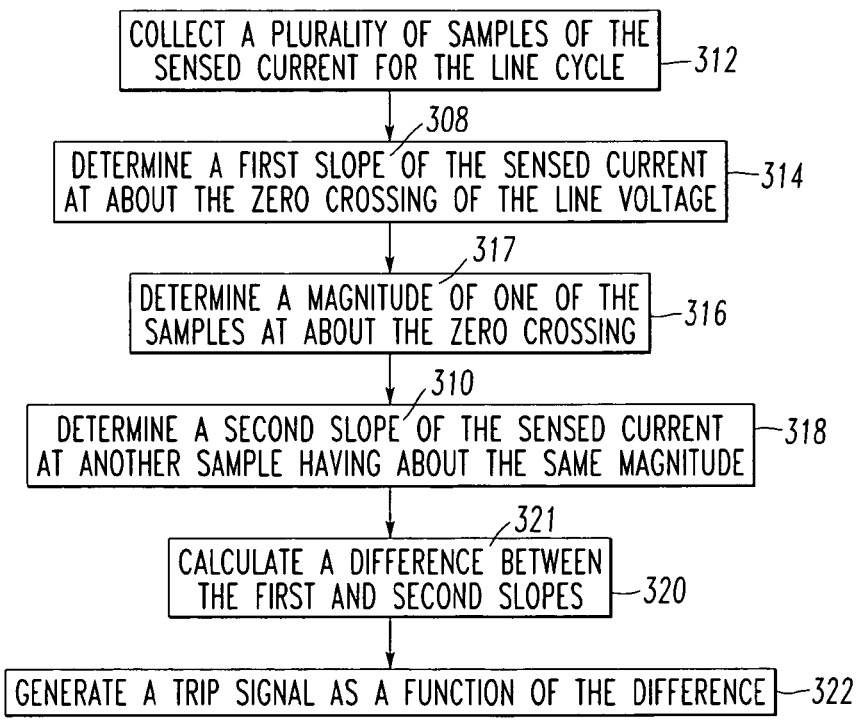
FIG. 10 is a simplified flowchart of a routine to determine the slopes of FIG. 9 and generate the trip signal of FIG. 1.

Next, at 360 of FIG. 11B, an integer match is set to −1, and, at 362, an integer, temp, is set to 0. Then, at 364, it is determined if sample[temp] is greater than sample[16]. If not, then, at 366, temp is incremented. Otherwise, at 368, match is set equal to temp before execution resumes at 372. After 366, it is determined if the integer temp is equal to one less than the current stack size. If not, then step 364 is repeated. Otherwise, step 372 is executed, which determines if the integer match is still equal to −1. If so, then the variable didt_diff, which is the difference 321 of FIG. 10, is set equal to 0 at 374. Otherwise, if a match was found, then the variable didt_diff is determined from the difference between (a) sample[match+1] less sample[match] and (b) sample[15] less sample[16]. In FIG. 11B, the routine 330 determines which current sample, match, on the leading edge of the current waveform is about equal to the value of the current sample at the negative zero crossing 61NZ. Then, if a valid match (e.g., match is not −1 in this example) is found, then the value if didt_diff is calculated at 376.

After either 374 or 376, a test is made to determine whether an accumulator, didt_diff_accum, should be updated at 380. The example test of 378 includes six sub-tests, although one, some or all of the sub-tests need not be performed. The sub-tests include: (1) is Ipeak 63 less than 35 A; (2) is Ipeak 63 greater than 10 A; (3) is sample[16]

greater than 0.5 A; (4) is didt_diff greater than saved_peak 219 (FIG. 4) divided by 16; (5) is the load 4 (FIG. 1) a compressor (e.g., as determined by step 150 of FIG. 2B); and (6) is first_nonzero_didt (from step 358 of FIG. 11A) less than max_didt (from step 340 of FIG. 11A) divided by 2. If all six of the example sub-tests pass, then step 380 increases the accumulator variable, didt_diff accum, by the variable didt_diff. Otherwise, or after 380, execution resumes at 382 of FIG. 11C.

The first sub-test of step 378 is employed to eliminate a nuisance trip on a relatively high inrush current. The second sub-test is employed to eliminate a nuisance trip on a relatively low current load. Checking the current sample[16] in the third sub-test is to determine that the load 4 is a compressor, which, unlike drills, for example, has a lagging power factor. Of interest, the difference of derivatives (e.g., Δi_difference 321 of FIG. 10, didt_diff, is checked, in order that variations are not accumulated based on noise. The fifth sub-test provides an additional check that the load 4 is, in fact, a compressor. The sixth sub-test provides an additional check that the load 4 is not a drill.

At 382 of FIG. 11C, it is determined if Ipeak 63 is greater than a suitable threshold (DIDT_CURRENT_THRESH) (e.g., without limitation, 1 A). If so, then at 384, the enable counter didt_trip_enable_ctr is incremented and the logical didt_trip_inhibit_ctr is set equal to 0. Otherwise, at 386, the enable counter didt_trip_enable_ctr is set equal to 0 and the logical didt_trip_inhibit_ctr is incremented. After either 384 or 386, it is determined if the enable counter is greater than a suitable threshold (DIDT_ENABLE_CNT_THRESH) (e.g., without limitation, 360 counts). If so, then, at 390, the enable logical didt_trip_enable is set (ENABLE) and the enable counter is set equal to its threshold (DIDT_ENABLE_CNT_THRESH). Otherwise, or after 390, at 392, it is determined if the inhibit counter is greater than a suitable threshold (DIDT_INHIBIT_CNT_THRESH) (e.g., without limitation, 30 counts). If so, then, at 394, the enable logical didt_trip_enable is reset (INHIBIT) and the inhibit counter is set equal to its threshold (DIDT_INHIBIT_CNT_THRESH). Otherwise, or after 394, at 396, it is determined if the enable logical didt_trip_enable is reset (INHIBIT). If so, then the accumulator, didt_diff_accum, is set to 0 at 398. Otherwise, or after 398, at 400, it is determined if Ipeak 63 is greater than a suitable saturation value (AD_SATURATION) (e.g., without limitation, about 45 A for the input 42 of FIG. 1). If so, then the accumulator, didt_diff_accum, is set to 0, at 402. Otherwise, or after 402, at 404, it is determined if the accumulator is greater than a suitable threshold (DIDT_DIFF_THRESH) (e.g., without limitation, about 6 A or about 6 A per sample). If so, then the trip signal 25 (FIG. 1) is asserted at 406 before the routine 330 exits at 412. On the other hand, if the test failed at 404, then, at 408, it is determined if the accumulator is greater than 0. If so, then the accumulator is decremented (e.g., without limitation, by about $\frac{1}{16}$ A) at 410 before the routine 330 exits at 412.

The di/dt routine 330 is preferably activated only when the load 4 is in steady-state. Hence, tripping is disabled during load start-up. In this example, with DIDT_INHIBIT_CNT_THRESH=30 and DIDT_ENABLE_CNT_THRES=360, for example, the load 4 must be on for six seconds continuously before trips are enabled. Also, the load 4 must be off for 30 cycles continuously before trips are disabled after which the routine 330 waits for the next load start-up. This helps to prevent nuisance trips from, for example, compressor and drill inrushes. For example, if there is a suitable duration (e.g., without limitation, 360 consecutive cycles; six continuous seconds; a suitable time) of load current, then the di/dt routine 330 is enabled. Also, if there is a suitable duration (e.g., without limitation, 30 consecutive cycles; 0.5 second; a suitable time) of no load current, then the di/dt routine 330 is disabled.

Although separable contacts 14 are disclosed, suitable solid state separable contacts may be employed.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An arc fault circuit interrupter comprising:
   a line terminal adapted to receive a line voltage including a zero crossing;
   a load terminal;
   separable contacts electrically connected between said line terminal and said load terminal;
   a current sensor adapted to sense current flowing between said line terminal and said load terminal and through said separable contacts, said sensed current including a line cycle;
   an arc fault detection circuit adapted to collect a plurality of samples of said sensed current for said line cycle, determine a first slope of said sensed current at about the zero crossing of said line voltage, determine a magnitude of one of said samples at about said zero crossing, determine a second slope of said sensed current at another one of said samples having about said magnitude, said first slope being opposite in polarity with respect to said second slope, calculate a difference between said first and second slopes, and generate a trip signal as a function of said difference; and
   an operating mechanism adapted to open said separable contacts responsive to said trip signal.

2. The arc fault circuit interrupter of claim 1 wherein said one of said samples at about said zero crossing is a first one of said samples; and wherein said arc fault detection circuit comprises a zero crossing detector adapted to detect the zero crossing of said line voltage and a routine adapted to determine said first slope based upon a difference between the first one of said samples and a second one of said samples prior to said first one of said samples, said routine also being adapted to determine a third one of said samples having about said magnitude of said first one of said samples, and determine said second slope based upon a difference between a fourth one of said samples after said third one of said samples and said third one of said samples.

3. The arc fault circuit interrupter of claim 2 wherein said zero crossing is a negative zero crossing; wherein said line cycle includes a positive half-cycle; wherein said first slope is a negative slope; wherein said second slope is a positive slope; wherein a count of said samples of said sensed current for the positive half-cycle of said line cycle is N; and wherein said first one of said samples is the Nth one of said samples and said second one of said samples prior to said first one of said samples is the (N−1)th one of said samples.

4. The arc fault circuit interrupter of claim 3 wherein said third one of said samples having about said magnitude of said first one of said samples is the Mth one of said samples; and wherein said fourth one of said samples is the (M+1)th one of said samples.

5. The arc fault circuit interrupter of claim 1 wherein said arc fault detection circuit is further adapted to determine if said difference is greater than a first value and, if so, responsively add an increment value to an accumulator, and determine if said accumulator exceeds a second predetermined value and, if so, generate said trip signal.

6. The arc fault circuit interrupter of claim 5 wherein said increment value is a fixed predetermined value.

7. The arc fault circuit interrupter of claim 5 wherein said line cycle includes a half-cycle; wherein said arc fault detection circuit is further adapted to determine a peak current of said samples of said sensed current for the half-cycle of said line cycle; and wherein said increment value is a function of said peak current.

8. The arc fault circuit interrupter of claim 5 wherein said increment value is a function of said difference.

9. The arc fault circuit interrupter of claim 5 wherein said arc fault detection circuit is further adapted to subtract a decrement value from said accumulator if said difference is not greater than said first value.

10. The arc fault circuit interrupter of claim 5 wherein said first value is a fixed predetermined value.

11. The arc fault circuit interrupter of claim 5 wherein said line cycle includes a half-cycle; wherein said arc fault detection circuit is further adapted to determine a peak current of said samples of said sensed current for the half-cycle of said line cycle; and wherein said first value is a function of said peak current.

12. The arc fault circuit interrupter of claim 5 wherein said line cycle includes a half-cycle; and wherein said arc fault detection circuit is further adapted to determine a peak current of said samples of said sensed current for the half-cycle of said line cycle, and determine if said peak current is greater than a third predetermined value and responsively clear said accumulator.

13. The arc fault circuit interrupter of claim 5 wherein said line cycle includes a half-cycle; and wherein said arc fault detection circuit is further adapted to determine a peak current of said samples of said sensed current for the half-cycle of said line cycle, and disable adding said increment value to said accumulator unless said peak current is greater than a first current and less than a second current.

14. The arc fault circuit interrupter of claim 13 wherein said arc fault detection circuit is further adapted to disable adding said increment value to said accumulator unless said magnitude of said one of said samples at about said zero crossing is greater than a third current.

15. The arc fault circuit interrupter of claim 13 wherein said arc fault detection circuit is further adapted to determine if said current flowing between said line terminal and said load terminal and through said separable contacts is associated with a compressor, and disable adding said increment value to said accumulator unless said current is associated with said compressor.

16. The arc fault circuit interrupter of claim 13 wherein the zero crossing of said line voltage is a negative zero crossing; wherein said line voltage also has positive zero crossing; and wherein said arc fault detection circuit is further adapted to determine a maximum positive value of the slope of said sensed current for said samples of said sensed current for the half-cycle of said line cycle, determine a positive slope of said sensed current after about the positive zero crossing, and disable adding said increment value to said accumulator unless said positive slope is less than one-half of said maximum positive value of the slope of said sensed current for said samples of said sensed current for the half-cycle of said line cycle.

17. The arc fault circuit interrupter of claim 1 wherein the zero crossing of said line voltage includes a positive zero crossing and a negative zero crossing; wherein said current flowing between said line terminal and said load terminal and through said separable contacts is associated with a compressor in parallel with an arc; and wherein an absolute value of the derivative of said current includes a notch at each of said positive zero crossing and said negative zero crossing.

18. The arc fault circuit interrupter of claim 1 wherein said arc fault detection circuit is further adapted to determine a start-up condition of said sensed current and responsively disable said trip signal.

19. The arc fault circuit interrupter of claim 18 wherein said line cycle includes a half-cycle; wherein said arc fault detection circuit is further adapted to determine a peak current of said samples of said sensed current for the half-cycle of said line cycle; and wherein said arc fault detection circuit is further adapted to disable said trip signal unless said peak current is greater than a predetermined current for a first predetermined time, and disable said trip signal if said peak current is less than said predetermined current for a second predetermined time.

* * * * *